United States Patent
Blonski

(10) Patent No.: US 9,756,164 B2
(45) Date of Patent: Sep. 5, 2017

(54) METHOD FOR HANDLING AN OUTGOING CALL CONNECTION IN A TELECOMMUNICATION DEVICE

(71) Applicant: ADVANCED DIGITAL BROADCAST S.A., Geneva (CH)

(72) Inventor: Pawel Blonski, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 0 days.

(21) Appl. No.: 15/213,413

(22) Filed: Jul. 19, 2016

(65) Prior Publication Data

US 2017/0034332 A1 Feb. 2, 2017

(30) Foreign Application Priority Data

Jul. 27, 2015 (EP) .................................. 15178409

(51) Int. Cl.
*H04M 1/725* (2006.01)
*H04W 68/00* (2009.01)
*H04W 76/04* (2009.01)

(52) U.S. Cl.
CPC ... *H04M 1/72519* (2013.01); *H04M 1/72569* (2013.01); *H04W 68/005* (2013.01); *H04W 76/045* (2013.01)

(58) Field of Classification Search
CPC . H04M 1/72519; H04W 4/16; H04W 76/045; H04W 76/06; H04W 76/068
See application file for complete search history.

(56) References Cited

U.S. PATENT DOCUMENTS

| | | | | |
|---|---|---|---|---|
| 7,233,788 B2 * | 6/2007 | Kedem | .................. | H04W 76/02 455/404.1 |
| 8,447,287 B2 * | 5/2013 | Katis | ....................... | H04W 4/16 379/201.1 |
| 2010/0316209 A1 * | 12/2010 | Drovdahl | ............ | H04M 3/4872 379/207.16 |
| 2011/0280198 A1 * | 11/2011 | Kim | .................. | H04W 52/0254 370/329 |
| 2012/0302214 A1 * | 11/2012 | Li | ..................... | H04M 1/72522 455/412.2 |
| 2014/0364093 A1 * | 12/2014 | Weksler | .............. | H04W 76/028 455/414.1 |

(Continued)

FOREIGN PATENT DOCUMENTS

CN 104717346 A 6/2015

*Primary Examiner* — Lewis West
(74) *Attorney, Agent, or Firm* — Mark M. Friedman

(57) ABSTRACT

A method for handling an outgoing call connection in a telecommunication device, comprising the steps of: detecting (201) a request for establishing a communication connection to a called party via the communication device (100*a*); detecting (202) proximity of the communication device to an object; detecting (203) subsequent lack of proximity of the communication device to the object, while awaiting accepting of the communication connection by the called party; detecting (204) establishment of the communication connection; starting (205) a timer; detecting (206) a request for terminating the communication connection; if the timer indicates a time below a predefined threshold (207), inhibiting (208) the request for terminating the communication connection; and indicating (209), by an indicator of the telecommunication device (100*a*), that the communication connection is established.

11 Claims, 3 Drawing Sheets

(56) References Cited

U.S. PATENT DOCUMENTS

2015/0024786 A1* 1/2015 Asrani ................. H04W 4/008
 455/456.4
2015/0148012 A1* 5/2015 Bhide .................. H04W 76/06
 455/414.1

* cited by examiner

METHOD FOR HANDLING AN OUTGOING CALL CONNECTION IN A TELECOMMUNICATION DEVICE

TECHNICAL FIELD

The present invention relates to handling outgoing call connections in telecommunication devices.

BACKGROUND

One of problems associated with outgoing call connections by handset telecommunication devices relates to cancelling established calls soon after their establishment. This typically occurs in a situation when a user holds the phone handset at the ear while listening to a waiting tone and after a few beeps decides to disconnect the call by using a disconnect button at the handset—this typically involves taking the handset away from the ear and pushing the disconnect button.

It may happen that the call was actually answered after the user took the handset away from the ear and could not hear the call being answered. This causes a few problems: the calling user perceives the call as unanswered, the answering user is annoyed by a call that has just been terminated, and the network traffic is used without bringing any positive result to the users. The communication efficiency thus decreases.

Therefore, there is a need to provide improvements to handling outgoing call connections in telecommunication devices in order to limit the number of calls that have been terminated soon after their establishment, to increase the communication efficiency and the efficiency of use of telecommunication network bandwidth.

Modern telecommunication devices are known to have functionality that enables detection of the state or position of the device. For example, a U.S. Pat. No. 8,744,425B2 discloses a mobile terminal apparatus that includes: a microphone; a switch control unit, which switches between a normal mode, in which a voice uttered toward the microphone is transmitted to an intended party, and a mute mode, in which the voice is not transmitted to the intended party; and a proximity sensor, which detects whether a detection object, such as user's ear, is in proximity to the proximity sensor. While the mute mode is being executed, if the detection object is detected by the proximity sensor, the switch control unit switches to the normal mode.

A US patent application US2007004470A1 discloses a mobile station having a proximity sensor and a power reducer that controls power consumption of the display. The proximity sensor is coupled to the chassis and causes the power consumption to be reduced when the display is within a predetermined range of an external object.

Thus, the proximity sensors have been used so far in the mobile stations to control the volume or display parameters, but their functionality related to handling calls has not been envisaged yet.

SUMMARY

The object of the invention is a method for handling an outgoing call connection in a telecommunication device, comprising the steps of: detecting a request for establishing a communication connection to a called party via the communication device; detecting proximity of the communication device to an object; detecting subsequent lack of proximity of the communication device to the object, while awaiting accepting of the communication connection by the called party; detecting establishment of the communication connection; starting a timer; detecting a request for terminating the communication connection; if the timer indicates a time below a predefined threshold, inhibiting the request for terminating the communication connection; and indicating, by an indicator of the telecommunication device, that the communication connection is established.

The method may further comprise detecting a second request for terminating the communication connection and terminating the connection in response to the second request.

The method may comprise comprising indicating that the communication connection is established via audio, visual or tactile feedback.

The method may further comprise, after detecting establishment of the communication connection, checking whether the answering machine has answered the connection at the called party, and if so, inhibiting the start of the timer in the subsequent step.

The method may further comprise inhibiting the request for terminating the communication connection by disregarding a command to terminate the connection.

Inhibiting the request for terminating the communication connection may be performed by disabling a call termination button of the user interface of the telecommunication device.

Inhibiting the request for terminating the communication connection may be performed by disabling touch actions on a touch screen.

The method may further comprise displaying, while the connection end request is being inhibited, a time indicator representative of the remaining time till the end of inhibition period.

Another object of the invention is a computer program comprising program code means for performing all the steps of the computer-implemented method as described above when said program is run on a computer, as well as a computer readable medium storing computer-executable instructions performing all the steps of the computer-implemented method as described above when executed on a computer.

The object of the invention is also a telecommunication device (100a, 100b) comprising: a telecommunication network interface configured to handle outgoing call connections; a proximity sensor configured to detect proximity of the telecommunication device to an object; a timer; an indicator configured to output audio, visual or tactile feedback. The device is characterized in that it further comprises a controller configured to handle outgoing call connections according to the method as described above.

The proximity sensor can be configured to detect proximity of the telecommunication device to an ear of the user.

BRIEF DESCRIPTION OF FIGURES

The invention is shown by means of exemplary embodiments on a drawing, in which.

DETAILED DESCRIPTION

Figure 1:
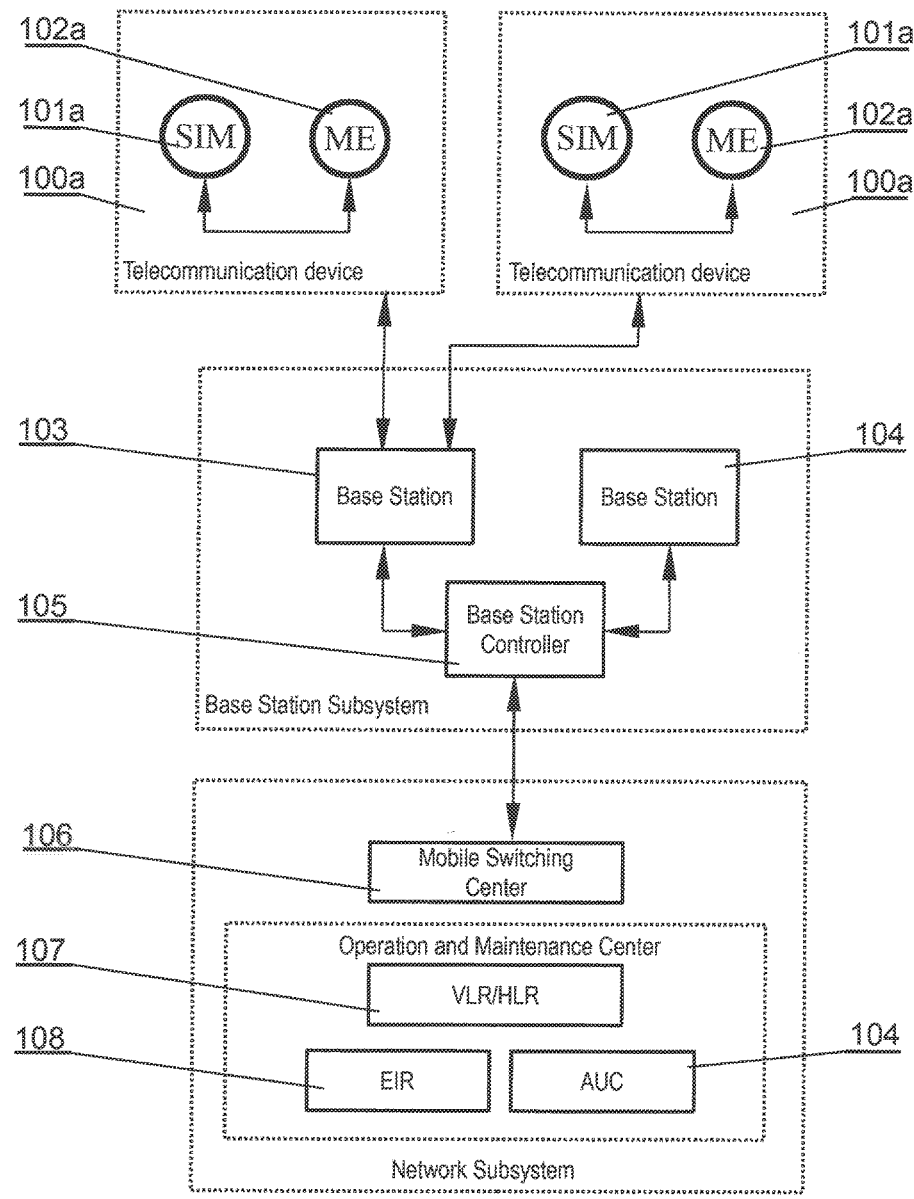
FIG. 1 shows an exemplary cellular network diagram.

FIG. 1 shows an exemplary cellular telephony network diagram. The present invention will be shown in an exemplary embodiment applied to and discussed with reference to a cellular telephony network. It will however be evident that the same principles may be readily applied to wireline telephony, Internet Protocol telephony or the like.

A telecommunication device 100a, 100b communicates with other components of a network by means of a communication channel, typically wireless. The wireless communication may be one of GSM, CDMA, Wi-Fi, WiMAX or other wide area network (WAN) technology. The telecommunication device 100a, 100b comprises a mobile equipment (ME) 102a, 102b—a physical telecommunication device in a form of a handset that includes a radio transceiver (typical smartphone or an IP-phone or a personal computer) and the like and subscriber identity module (SIM) 101a, 101b. The telecommunication devices will remain generic telecommunication devices until a SIM 101a, 101b is inserted, allowing for personalization of the telecommunication device and services.

A base station subsystem (BSS) comprises a base station controller 105 and one or more base transceiver stations (BTS) 103, 104. It may also have equipment for encrypting and decrypting communications. Each BTS 103, 104 defines a single cell, includes a radio antenna, a radio transceiver and a link to the base station controller (BSC) 105. The BSC 105 reserves radio frequencies, manages call handoff of telecommunication devices 100a, 100b from one cell to another cell within BSS, and controls paging.

A BSC 105 additionally communicates with a network subsystem that provides link between cellular network and another network such as PSTN, controls handoffs between cells in different BSSs, authenticates users and validates accounts, enables worldwide roaming of mobile users.

The central element of the network subsystem is the mobile switching center (MSC) 106. The mobile switching center (MSC) 106 is the primary service delivery node for GSM/CDMA, responsible for routing voice calls and SMS as well as other services (such as conference calls, FAX and circuit switched data). The Mobile Switching Center (MSC) 106 communicates with (a) a home location register (HLR) database, which stores information about each subscriber that belongs to it, with (b) a visitor location register (VLR) database 107, which maintains information about subscribers currently physically in the covered region, (c) an authentication center 109 database (AuC) used for user and service authentication that also has access to encryption keys, (d) an equipment identity register database (EIR) 108 that keeps track of the type of equipment that exists at a telecommunication device 100a, 100b.

These different modules allow for managing an operation and maintenance center.

A GSM network uses a set of protocols to communicate between different elements. Therefore, such a GSM network is a family of data communication protocols. Any protocol stack for data communication, for example TCP/IP (Transmission Control Protocol/Internet Protocol), can be implemented. GSM protocol architecture comprises three independent layers: a user layer, a control layer and a management layer.

The user layer defines protocols to carry connection oriented voice and user data. The control layer defines a set of protocols for controlling these connections with signaling information, for example signaling for connection setup. The management layer function are functions related to the system as a whole including layer coordination, functions related to resources and parameters residing in the layers of the control and/or user layer.

Different protocols provide different specific functions such as: radio resource management, mobility management, connection management, mobile application part (MAP), BTS management.

Implementation of all these functions allows to communicate two telecommunication devices together, to issue information regarding availability of a telecommunication device for a call, sending 'busy' messages, identifying subscribers.

The present will increase the efficiency of use of the network resources by limiting the number of calls that are terminated soon after their establishment.

Figure 2:
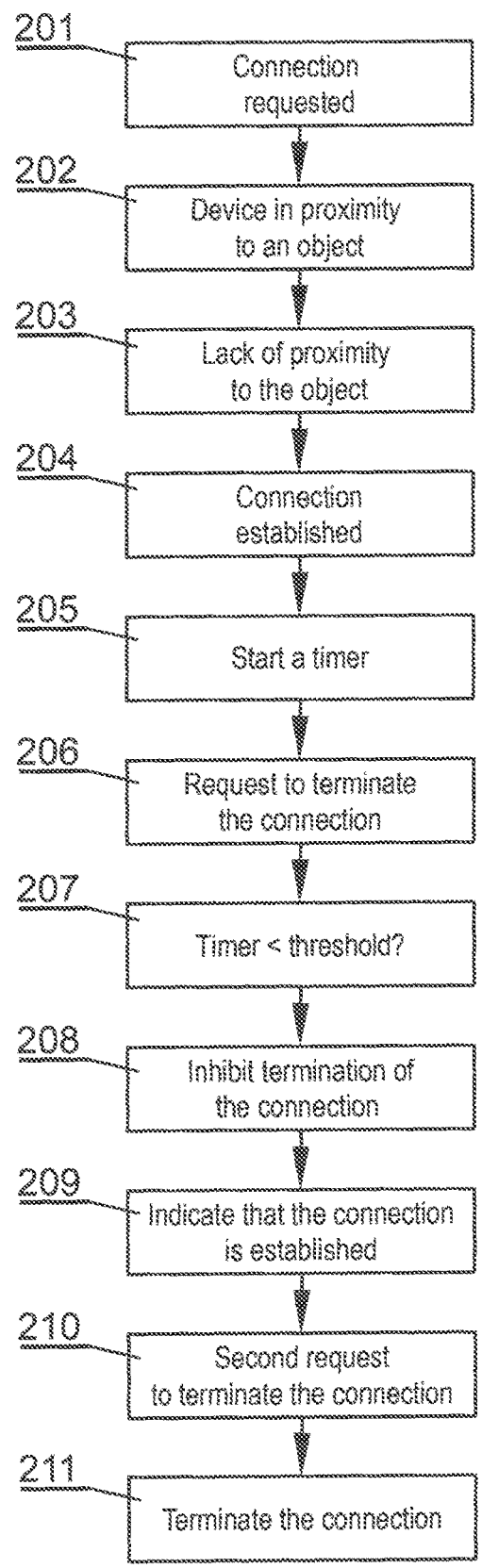
FIG. 2 shows a diagram of the method according to the present invention.

FIG. 2 shows a diagram of the method for handling an outgoing call connection in a telecommunication device 100a, 100b. In step 201, a request for establishing a communication connection via the communication device is detected, for example when the user selects a party to be called to, for example by inputting a telephone number, selecting a party identifier from a list or inputting a voice command e.g. with a name of the party.

Subsequently, in step 202, the proximity of the communication device to an object, such as user's ear, is detected by a proximity sensor installed in the device. Typically, in step 201 the user will hold the telecommunication device (e.g. a handset) hi front of the user, and having selected the party to be called to, the user will move the device towards user's ear, which will be detected in step 202.

Next, the proximity of the device to the object is monitored, while awaiting accepting of the connection by the second party (typically this will be signaled, to a telecommunication device 100a, by a BTS handling the communication call) and it is checked in step 203 whether there occurred a lack of proximity of the communication device to the object. The lack of proximity can occur e.g. after the user decided to terminate the connection and starts to move the device from user's ear to the front of the user in order to press the "terminate" button at the handset (or to execute any other action resulting in a call termination).

It is then checked, in step 204, whether a communication call was answered (the callee has accepted the communication call) after the lack of proximity was detected. If so, then in step 205 a timer is started. At this point, in one embodiment of the present invention, the timer may be not started when a communication has been established, but it is detected that it is a communication with an answering machine. For example, this can be done by detecting a predefined tone or message generated by the called party when answering the connection.

Next it is checked, in step 206, whether the user of the device has issued a communication connection end request, e.g. by pressing or touching the "disconnect" button at the handset or speaking an "end call" voice command. Then, in step 207, it is checked whether the timer indicates a time below a predefined threshold, such as 1 or 2 seconds. This is a likely indication, that the user did not realize that the call was actually answered after the user took the headset away from user's ear. If so, the communication connection end request is inhibited in step 208, i.e. the command is disregarded and the connection is not terminated.

Sometimes, a user may realize that the call was actually answered, i.e. by looking at a display screen, while making an intended touch action on the touch display. Still it is only the user's sight that is able to catch this fact, while the user cannot prevent the touching action. This is because sight is a sensor while movement is a reaction to the sensed event. Clearly sight reaction time is much lower that movement reaction time. In case the present invention is not applied, the user ends up with a disconnected call and he may decide to place another call having realized that the previous has actually been answered. At the same time the callee may try to do the same, which may result in a simultaneous call situation, where both simultaneous or nearly simultaneous calls will not be effective, still resulting in lack of the intended connection.

In one embodiment of the present invention, the inhibiting action may be based on disabling of the screen button (e.g. the call termination button) or on disabling of touch action full-screen i.e. touch actions on a touch screen will not be processed for a predefined period of time.

Figure 4:
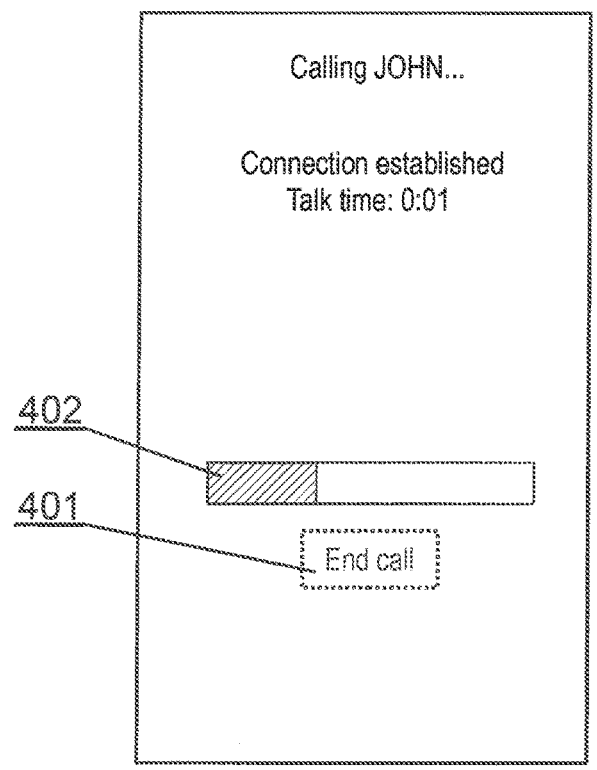
FIG. 4 depicts an example of a user interface screen.

Furthermore, while the connection termination request is being inhibited, the input interface of the telecommunication device (e.g. a touchscreen) may display a time remaining till the end of the inhibition period, i.e. the difference between the current value of the timer and the threshold. An example of such user interface screen is shown in FIG. 4, wherein the call termination button 401 is disabled and a timer 402 is displayed in form of a decreasing progress bar.

Subsequently, an indication message is issued in step 209, via an indicator, in order to alert the user that the connection has been established. The alert may be an audio alert (such as a beep tone, an audio message), a visual alert (such as a flashlight, a message displayed on screen of the device, highlight of the keyboard) or a tactile alert (such as vibration of the device).

The user, having been alerted that the connection has been established, may continue the connection or issue a second termination command in step 210, which can be accepted in step 211 and the connection can be then terminated.

Figure 3:
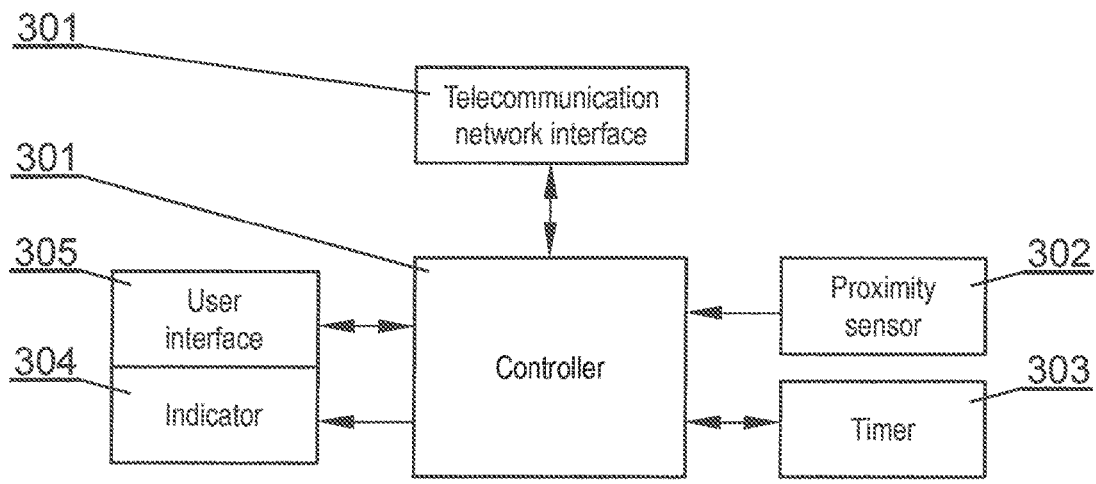
FIG. 3 shows a structure of the communication device according to the present invention.

FIG. 3 shows a structure of the communication device 100a, 100b according to the present invention. The device comprises a telecommunication network interface 301 for handling outgoing call connections to other parties via the communication network. The communication network interface 301 is controlled by the controller 310 in response to commands issued by the user via the user interface 305, such as a keyboard, a voice input interface, a touch interface, a gesture recognition interface etc. The user may input, via the user interface 305, commands such as a request to establish a connection or a request to terminate the connection.

A proximity sensor 302 is installed in the device to detect proximity of the device to an object, such as user's ear. The proximity sensor 302 can be a capacitive proximity sensor, ultrasonic proximity sensor, an inductive proximity sensor, etc. For example, a capacitive proximity sensor may detect changes of capacitance, which increases as a detection object (such as a user's ear or the like) approaches the proximity sensor, and may output a detection signal when the capacitance exceeds a threshold value. The proximity sensor can be also a heat flow sensor, a temperature sensor, an optical sensor, an infrared sensor, or a load sensor. Any kind of proximity sensor which is capable of observing a close range or small distance from an object to be detected may be used.

The device further comprises a timer 303 which is started, when lack of proximity is detected while awaiting accepting of the connection, to count the time between the communication establishment and a request to terminate the communication.

An indicator 304 is provided to output audio, visual or tactile feedback. The indicator 304 may be a separate module configured for the sole purposes of indicating that the connection is established, or may be one of modules of the overall user interface 305, such as a speaker (to be also used for hands free talking), a display (such as the main display of the telephone), a flashlight, a highlighted keyboard, or a vibration module.

The controller 310 of the device is further configured to handle outgoing call connections according to the method as described with reference to FIG. 2. The controller can be the main processor of the telecommunication device and its operation may be configured by one or more computer programs. The programs can be stored in a non-volatile memory, for example a flash memory or volatile memory, for example RAM. These memories are exemplary recording media for storing computer programs comprising computer-executable instructions performing all the steps of the method as presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for handling an outgoing call connection in a telecommunication device, comprising the steps of:
    detecting (201) a request for establishing a communication connection to a called party via the communication device (100a);
    detecting (202) proximity of the communication device to an object;
    detecting (203) subsequent lack of proximity of the communication device to the object, while awaiting accepting of the communication connection by the called party;
    detecting (204) establishment of the communication connection;
    starting (205) a timer;
    detecting (206) a request for terminating the communication connection;
    if the timer indicates a time below a predefined threshold (207), inhibiting (208) the request for terminating the communication connection; and
    indicating (209), by an indicator of the telecommunication device (100a), that the communication connection is established.

2. The method according to claim 1, further comprising detecting (210) a second request for terminating the communication connection and terminating (211) the connection in response to the second request.

3. The method according to claim 1, comprising indicating (209) that the communication connection is established via audio, visual or tactile feedback.

4. The method according to claim 1, further comprising, after detecting (204) establishment of the communication connection, checking whether the answering machine has answered the connection at the called party, and if so, inhibiting the start of the timer in the subsequent step (205).

5. The method according to claim 1, comprising inhibiting (208) the request for terminating the communication connection by disregarding a command to terminate the connection.

6. The method according to claim 1, comprising inhibiting (208) the request for terminating the communication connection by disabling a call termination button (401) of the user interface of the telecommunication device.

7. The method according to claim 1, comprising inhibiting (208) the request for terminating the communication connection by disabling touch actions on a touch screen.

8. The method according to claim 1, further comprising displaying, while the connection end request is being inhibited, a time indicator (402) representative of the remaining time till the end of inhibition period.

9. A non-transitory computer readable medium storing computer-executable instructions performing all the steps of the computer-implemented method according to claim 1 when executed on a computer.

10. A telecommunication device (100*a*, 100*b*) comprising:
   a telecommunication network interface (301) configured to handle outgoing call connections;
   a proximity sensor (302) configured to detect proximity of the telecommunication device to an object;
   a timer (303);
   an indicator (304) configured to output audio, visual or tactile feedback;
   the device being characterized in that it further comprises a controller (310) configured to handle outgoing call connections according to the method of claim 1.

11. The device according to claim 10, wherein the proximity sensor (302) is configured to detect proximity of the telecommunication device to an ear of the user.

* * * * *